United States Patent
Parron et al.

(10) Patent No.: US 10,448,278 B2
(45) Date of Patent: Oct. 15, 2019

(54) COMMUNICATION TERMINAL AND METHOD FOR HANDLING UPLOAD TRAFFIC CONGESTION

(71) Applicant: Intel IP Corporation, Santa Clara, CA (US)

(72) Inventors: Jerome Parron, Fuerth (DE); Reinhold Schneider, Veitsbronn (DE)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 15/739,177

(22) PCT Filed: May 18, 2016

(86) PCT No.: PCT/US2016/032959
§ 371 (c)(1),
(2) Date: Dec. 22, 2017

(87) PCT Pub. No.: WO2016/209421
PCT Pub. Date: Dec. 29, 2016

(65) Prior Publication Data
US 2018/0176818 A1  Jun. 21, 2018

(30) Foreign Application Priority Data
Jun. 26, 2015 (DE) .......... 10 2015 110 349

(51) Int. Cl.
*H04W 28/02* (2009.01)
*H04W 28/14* (2009.01)
(Continued)

(52) U.S. Cl.
CPC ... *H04W 28/0289* (2013.01); *H04W 28/0278* (2013.01); *H04W 28/0284* (2013.01);
(Continued)

(58) Field of Classification Search
CPC combination set(s) only.
See application file for complete search history.

(56) References Cited

U.S. PATENT DOCUMENTS 6,894,974 B1  5/2005  Aweva et al.
6,999,432 B2  2/2006  Zhang et al.
(Continued)

FOREIGN PATENT DOCUMENTS

WO  2006130962 A1  12/2006

OTHER PUBLICATIONS

German Office Action based on application No. 10 2015 110 349.4 (10 pages) dated Nov. 16, 2015 (Reference Purpose Only).
(Continued)

*Primary Examiner* — Warner Wong
(74) *Attorney, Agent, or Firm* — Viering, Jentschura & Partner MBB

(57) ABSTRACT

A communication terminal is provided including a detector configured to detect an upload data traffic congestion situation in the communication terminal, a classifier configured to assign, in response to the detection of an upload data traffic congestion situation, a communication service class for which upload data traffic is to be reduced and a controller configured to initiate a reduction of upload data traffic belonging to a communication service of the assigned communication service class.

20 Claims, 6 Drawing Sheets

(51) Int. Cl.
*H04L 12/26* (2006.01)
*H04W 28/18* (2009.01)
*H04W 28/26* (2009.01)
*H04W 8/22* (2009.01)

(52) U.S. Cl.
CPC ............ *H04W 28/14* (2013.01); *H04L 43/08* (2013.01); *H04W 8/22* (2013.01); *H04W 28/18* (2013.01); *H04W 28/26* (2013.01)

(56) References Cited

U.S. PATENT DOCUMENTS

| | | | |
|---|---|---|---|
| 2004/0109412 A1* | 6/2004 | Hansson | H04L 47/10 370/229 |
| 2008/0026744 A1* | 1/2008 | Frederiksen | H04L 1/0026 455/425 |
| 2008/0192685 A1* | 8/2008 | Usuda | H04W 28/10 370/329 |
| 2008/0261606 A1* | 10/2008 | Usuda | H04L 47/10 455/450 |
| 2009/0034610 A1 | 2/2009 | Lee et al. | |
| 2009/0103450 A1 | 4/2009 | Peisa et al. | |
| 2010/0113037 A1* | 5/2010 | Ong | H04L 47/11 455/445 |
| 2011/0305217 A1 | 12/2011 | Seok | |
| 2012/0327779 A1 | 12/2012 | Gell et al. | |
| 2013/0121147 A1* | 5/2013 | Tapia | H04W 28/0289 370/230 |
| 2013/0265874 A1 | 10/2013 | Zhu et al. | |
| 2014/0071815 A1* | 3/2014 | Gu | H04W 28/0289 370/229 |
| 2014/0112172 A1* | 4/2014 | Vangala | H04W 24/06 370/252 |
| 2014/0146681 A1 | 5/2014 | Gusavec et al. | |
| 2014/0286161 A1* | 9/2014 | Zhang | H04W 52/241 370/230 |
| 2014/0341017 A1* | 11/2014 | Mutikainen | H04W 28/0268 370/230 |
| 2016/0337909 A1* | 11/2016 | Cai | H04W 36/0033 |
| 2018/0176818 A1* | 6/2018 | Parron | H04W 28/0284 |

OTHER PUBLICATIONS

International Search Report based on application No. PCT/US2016/032959 (3 pages) dated May 18, 2016 (Reference Purpose Only).

* cited by examiner

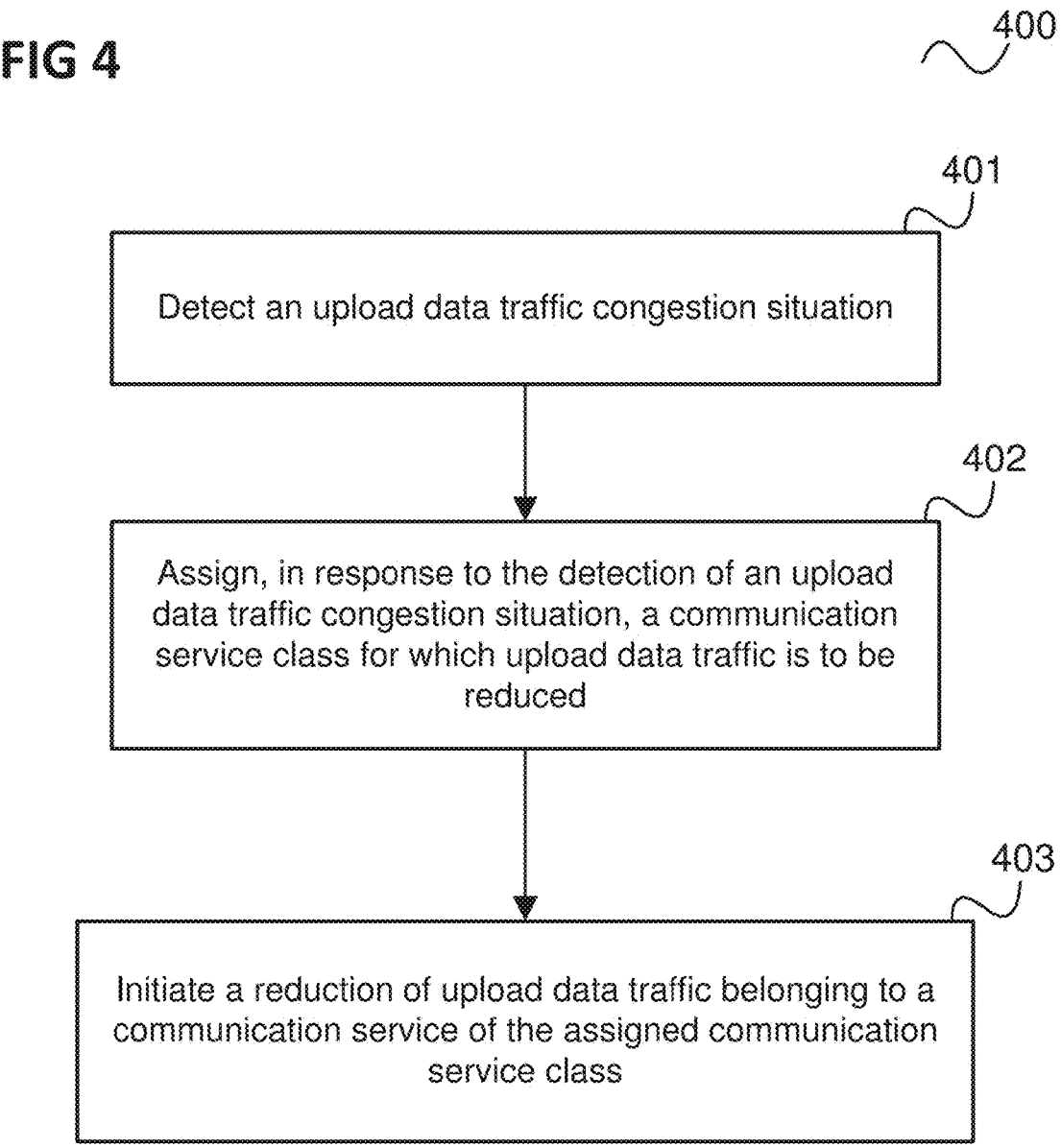

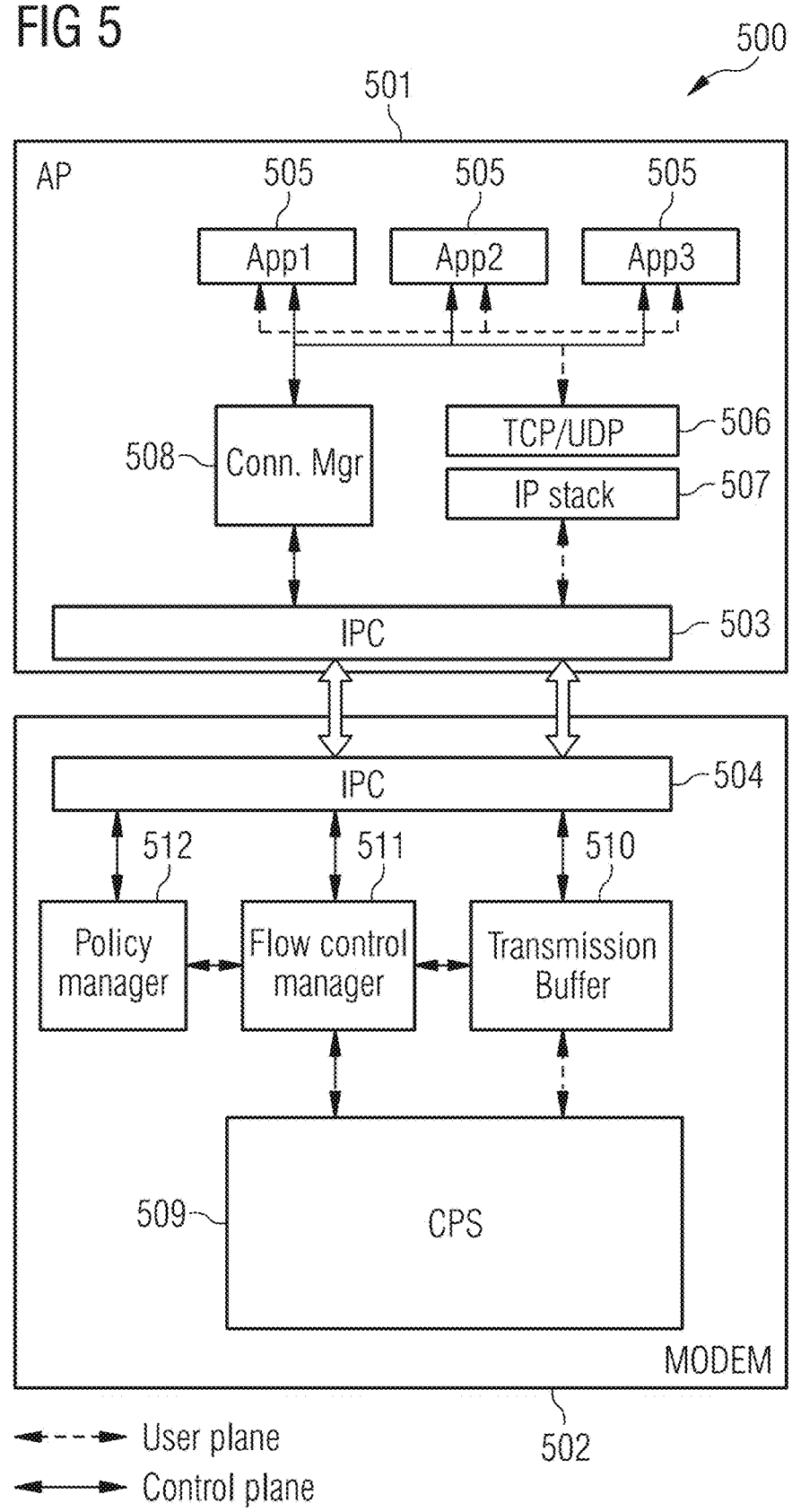

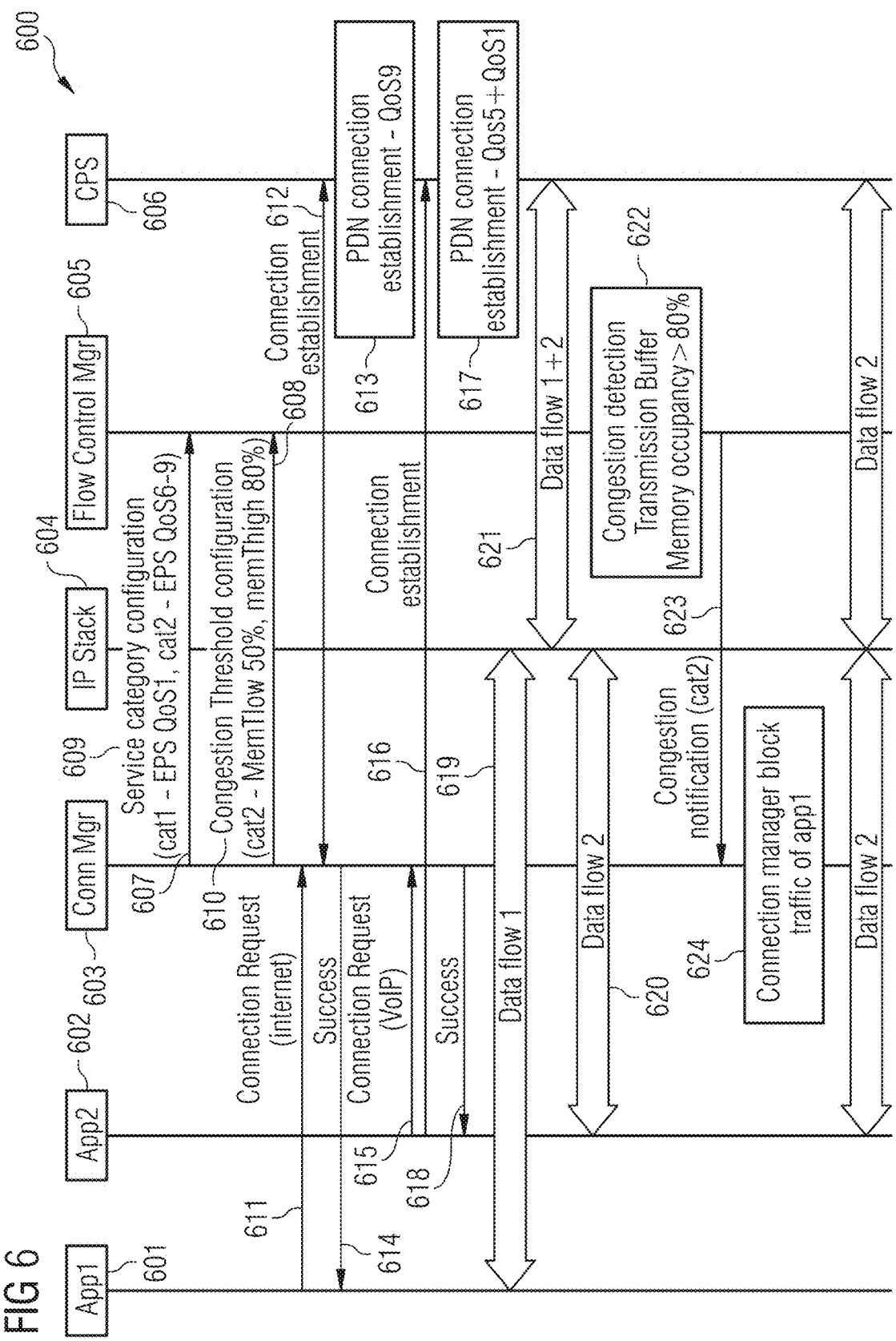

COMMUNICATION TERMINAL AND METHOD FOR HANDLING UPLOAD TRAFFIC CONGESTION

RELATED APPLICATIONS

The present application is a national stage entry according to 35 U.S.C. § 371 of PCT application No.: PCT/US2016/032959 filed on May 18, 2016, which claims priority from German application No.: 10 2015 110 349.4 filed on Jun. 26, 2015, and is incorporated herein by reference in its entirety.

TECHNICAL FIELD

Embodiments described herein generally relate to communication terminals and methods for handling upload traffic congestion.

BACKGROUND

The upload communication data rate of a communication terminal is typically limited, e.g. depending on the amount of allocated communication resources and the radio situation of the communication terminal. Thus, when upload data is generated in the communication terminal at a higher rate than the upload communication data rate, the transmission of generated upload data is delayed. If such a situation persists, this may lead to upload traffic congestion and, e.g. an upload transmission buffer overflow. Efficient approaches to handle such situations are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 4 shows a flow diagram illustrating a method for handling upload traffic congestion.

FIG. 5 illustrates an example of an architecture of a communication terminal for supporting the approach described above with reference to FIG. 3.

FIG. 6 shows a message flow diagram illustrating an example for a procedure for handling a congestion.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
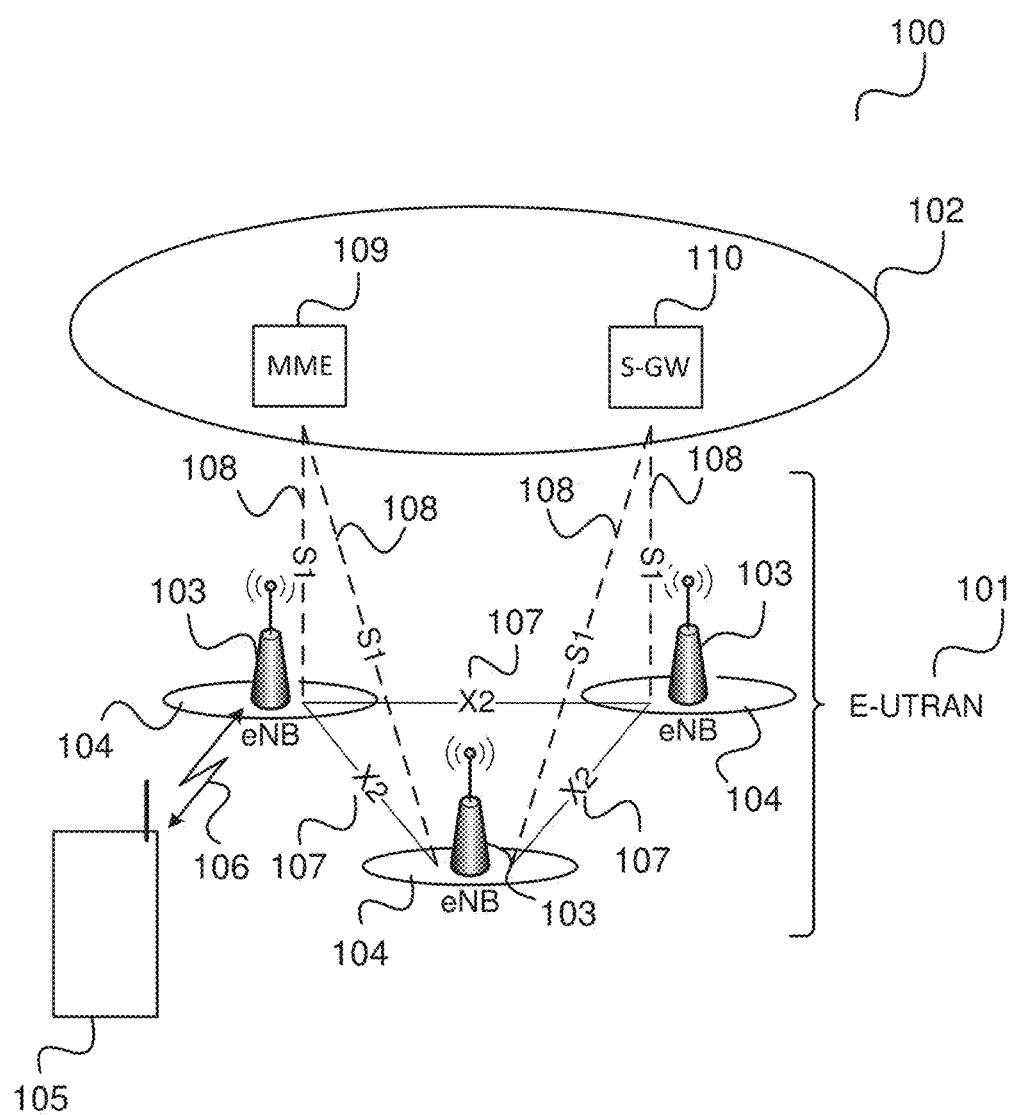
FIG. 1 shows a communication system.

FIG. 1 shows a communication system 100, for example according to 3GPP (Third Generation Partnership Project).

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications), WIFI etc.

A mobile terminal (e.g. a UE) 105 located in a mobile radio cell 104 may communicate with the core network 102 and with other mobile terminals via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the mobile communication standard air interface, such as LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of mobile communication standard such as LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

Using its connection to the E-UTRAN 101 and the core network 102, the mobile terminal 105 can communicate with other devices located in other networks, e.g. a server in the Internet, for example for downloading data using a TCP (Transport Control Protocol) connection according to FTP (File Transport Protocol) or for exchanging data (e.g. speech or video data) with another mobile terminal.

Figure 2:
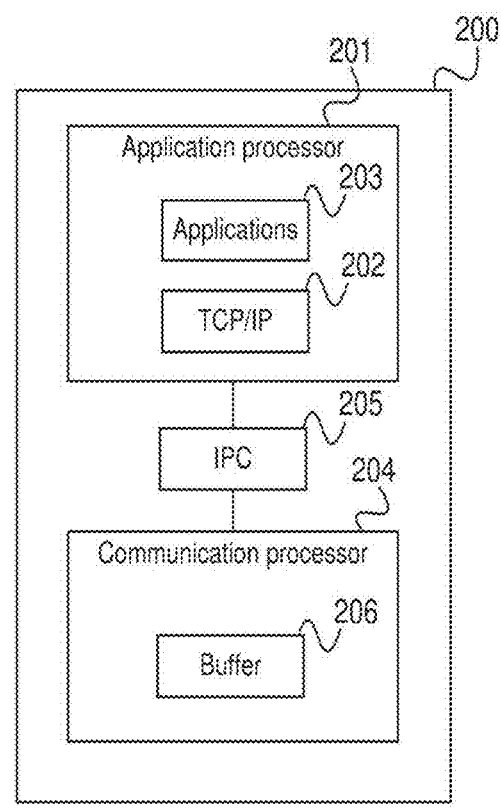
FIG. 2 shows a mobile terminal.

FIG. 2 shows a mobile terminal 200.

The mobile terminal 200 for example corresponds to the mobile terminal 105.

The mobile terminal (or UE in case of an LTE communication system) 200 includes an application processor (AP) 201 hosting the TCP/IP stack 202 and end user applications 203, a cellular modem (or communication processor, CP) 204 implementing the modem functionality and an inter processor communication (IPC) interface 205 between the application processor 201 and the communication processor 204. The application processor 201 and the communication processor 204 may also be implemented by the same processor. For example, they may be implemented by a multi-core processor wherein applications 203 run on one core and the modem functionality is running on another core. The application processor 201 and the communication processor 204 may also be provided by the same core (i.e. code providing the application processor functionality and the communication processor functionality may run on one core) using a virtualization solution, having multiple virtual cores running on one physical core.

The mobile terminal 200 may include further typical components like one or more antennas, a speaker, a microphone, a display and so on which are not shown in FIG. 2.

The application processor 201 is typically mainly IP (Internet protocol) based, e.g. handles quality of service at the IP layer. It typically has no knowledge of 3GPP QoS classification. There may be AT commands (or another configuration functionality, e.g. binary based, SNMP (Simple Network Management Protocol) based, etc) for the application processor 201 to query the QoS of a PDN connection on the modem 204.

The communication processor 204 handles the modem functionality. It may take varying radio conditions into account and therefore typically deploys a rather large transmission buffer 206 to overcome short term bandwidth variations in uplink direction (UL), i.e. via the air interface 106 towards the radio access network 101 and the core network 102. This buffer 206 may, however, be used up by the TCP protocol as the TCP bandwidth calculation algorithm is partly based on packet drops (anywhere on the path to the peer) which on mobile terminal 200 happens only after the buffer 206 is filled up. This leads to the buffer bloating. The buffer bloating phenomena results in additional delays (to TCP flows) and in congestion. UDP based services are also likely to overrun memory storage or air bandwidth capacity due to the missing feedback on the UDP protocol. This is especially true if the bandwidth at the air interface sharply decreases, from e.g. 15 Mbps to 1 Mbps, and the application processor 201 has no idea about that.

In such a congestion situation, the transmission buffer 206 of the cellular modem 204 can overflow, for instance, in the case that one or more applications 203 are sending more data to the modem 204 than the modem 204 is able to transmit over the air interface 106. In such a situation, a flow control mechanism is to be deployed/implemented to resolve the overflow/congestion state.

However, flow control mechanism present in modems may typically be very restrictive, for example including deletion of data that cannot be stored or deletion of previously buffered (unsent) data and replacing it by incoming data in the transmission buffer or blocking of the complete IPC interface preventing any new incoming data from applications running on the application processor.

Data deletion leads to additional processing on the modem and the application processor due to the deletion operation and the following retransmission of the data by the respective application as well as to additional delay depending on the retransmission algorithm of the transport layer (for instance the TCP), the application layer or session layer, for instance with SIP (Session Initiation Protocol). Further, in case of data deletion, the congestion situation may persist if the application or the transport layer does not reduce the transfer rate in a timely manner.

Blocking the IPC interface completely leads to the situation that none of the applications using this interface can send data anymore. This may especially have an impact on services like Voice over IP calls (VoLTE for instance) running in parallel to other data transfers. This means that a congestion situation leads to flow control stopping all data transmission over the IPC interface which for example leads to voice data being blocked and thus resulting in bad user experience.

In the following, an approach for handling a upload data traffic congestion situation is described which may allow a more gradual and service based flow control mechanism.

Figure 3:
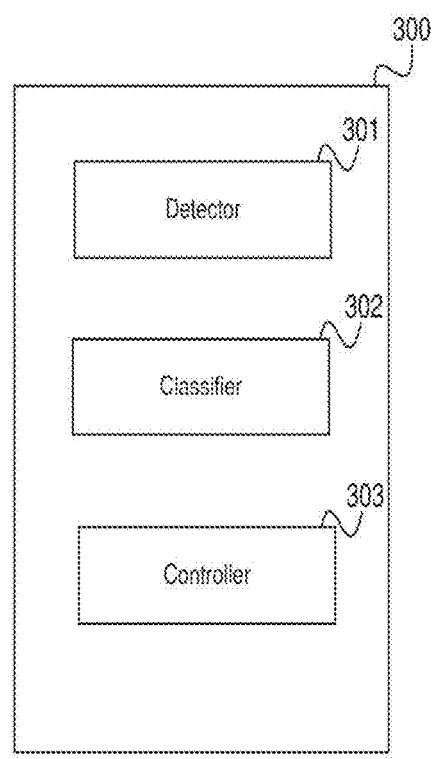
FIG. 3 shows a communication terminal.

FIG. 3 shows a communication terminal 300.

The communication terminal 300 includes a detector 301 configured to detect an upload data traffic congestion situation in the communication terminal and a classifier 302 configured to assign (in other words to set), in response to the detection of an upload data traffic congestion situation, a communication service class for which upload data traffic is to be reduced.

The communication terminal 300 further includes a controller 303 configured to initiate a reduction of upload data traffic belonging to a communication service of the assigned communication service class.

In other words, for example, the communication terminal (e.g. including, as described with reference to FIG. 2, an application processor and a communication processor) reduces traffic depending on service type. This means that in case of a congestion situation, the communication terminal may reduce traffic belonging to certain services (such as data download or video) while keeping the amount of traffic for other services (such as speech data of a call) unaffected. The classifier 302 may for example select one or more communication service classes of a plurality of predefined service classes as communication service class(es) for which upload traffic is to be reduced.

The detector 301 may carry out the detection of the upload data traffic congestion situation can be per communication service class, i.e. a criterion for a congestion situation (also referred to as congestion detection criterion) may be met for one communication service class while it is not met for another communication service class. The communication service class definition and corresponding congestion detection criteria may for example be configured by an application processor of the communication terminal 300.

An application and/or a connection manager may for example be allowed to reduce or stop low priority traffic in case of congestion before an overflow of the modem's transmission buffer is reached. For example, an Android connection manager or a Microsoft Windows connection manager may use a flow control indication from the modem to restrict/stop traffic of some specific service and one or more corresponding applications.

For example, the communication terminal may serve different applications with different priorities running over the same IPC interface and/or connection. For instance, in case of a congestion, the communication terminal may block background data transfer and still allow a voice over IP call to continue, even if for a plurality of services data are flowing over the same IPC or even the same packet data network (PDN) connection. Thus, there is the possibility for a high priority service to continue despite the congestion situation in contrast to a blocking of all services when the IPC is completely blocked by flow control triggered in a congestion situation as described above.

It should be noted that, for example, when using USB as the IPC interface, the USB-NCM (Universal Serial Bus-Network Control Model) or the USB-MBIM (USB-Mobile Broadband Interface Model) do not provide an approach to handle flow control for different service running over the same PDN connection.

It should further be noted that the approach described above with reference to FIG. 3 can be combined with other flow control mechanisms.

A communication service class (or service category) may be understood as class of communication service which share a common characteristic such as the same type of data that is communicated (e.g. call video data, call speech data, data files), the same priority (e.g. logical channel priority), the same quality of service (QoS) requirement, the similar bandwidth requirements, similar latency requirements, port number etc. The communication services classes may for example be predefined and their definition (e.g. in terms of value ranges of one or more of the above characteristics) may be stored in the communication terminal to allow the controller 303 to assign the communication service class to which a certain communication service belongs.

For example, the definition of communication service classes may include the definition of the communication service classes "file upload", "video data upload for a call" and "speech data upload for a call" wherein, in a congestion situation, "file upload" is given the least priority and "speech data upload for a call" is given the highest priority such that, in case of a congestion, the controller first initiates a reduction of "file upload" data and only if this is not sufficient a reduction of "video data upload for a call" data and if this is still not sufficient a reduction of "speech data upload for a call" data.

The components of the communication terminal (e.g. the detector, the classifier and the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

The communication terminal 300 may for example carry out a method as illustrated in FIG. 4.

FIG. 4 shows a flow diagram 400 illustrating a method for handling upload traffic congestion, for example carried out by a communication terminal.

In 401, the communication terminal detects an upload data traffic congestion situation.

In 402, the communication terminal assigns, in response to the detection of an upload data traffic congestion situation, a communication service class for which upload data traffic is to be reduced.

In 403, the communication terminal initiates a reduction of upload data traffic belonging to a communication service of the assigned communication service class.

The following examples pertain to further embodiments.

Example 1 is a communication terminal as illustrated in FIG. 3.

In Example 2, the subject matter of Example 1 may optionally include a communication processor and an application processor wherein the communication processor comprises the detector, the classifier and the controller.

In Example 3, the subject matter of Example 2 may optionally include the controller being configured to initiate the reduction of upload data traffic by transmitting a congestion notification to the application processor.

In Example 4, the subject matter of any one of Examples 2-3 may optionally include the congestion notification specifying that the application processor is to reduce upload data traffic.

In Example 5, the subject matter of any one of Examples 2-4 may optionally include the application processor comprising a connection manager configured to reduce upload data traffic belonging to a communication service of the assigned communication service class.

In Example 6, the subject matter of any one of Examples 2-5 may optionally include a reduction of the upload data traffic comprising identifying an application running on the application processor using a communication service of the assigned communication service class and requesting the application to reduce upload data traffic.

In Example 7, the subject matter of any one of Examples 1-6 may optionally include the controller being configured to initiate a reduction of upload data traffic belonging to a communication service of the assigned communication service class and to keep the amount of traffic of communication services of other communication service classes than the assigned communication services unaffected.

In Example 8, the subject matter of any one of Examples 1-7 may optionally include the detector being configured to detect an upload data traffic congestion situation in the communication terminal based on one or more predefined congestion criteria.

In Example 9, the subject matter of Example 8 may optionally include the one or more predefined congestion criteria being based on a buffer occupancy of a transmission buffer of the communication terminal configured to buffer upload data, a data residency time of a transmission buffer of the communication terminal configured to buffer upload data or a channel capacity of a communication channel for transmitting upload data.

In Example 10, the subject matter of any one of Examples 1-9 may optionally include the detector being configured to detect a level of an upload data traffic congestion situation in the communication terminal and the controller being configured to initiate a reduction of upload data traffic belonging to a communication service of the assigned communication service class depending on the level of the upload data traffic congestion situation.

In Example 11, the subject matter of any one of Examples 1-10 may optionally include the controller being configured to initiate, depending on the level of the upload data traffic congestion situation, a blocking of upload data traffic belonging to a communication service of the assigned communication service class or notifying a source of the upload data traffic belonging to a communication service of the assigned communication service class to reduce the upload data traffic.

In Example 12, the subject matter of any one of Examples 1-11 may optionally include the detector being configured to detect an end of the upload data traffic congestion situation and the controller being configured to stop the reduction of upload data traffic when the detector has detected the end of the upload data traffic congestion situation.

In Example 13, the subject matter of any one of Examples 1-12 may optionally include a memory storing, for each communication service class of a plurality of communication service classes, a definition of the communication service class in terms of characteristics of traffic belonging to the communication service class.

In Example 14, the subject matter of Example 13 may optionally include the characteristics of traffic including one or more of IP or TCP header information of data packets of the traffic, radio bearer quality of service of the traffic, logical channel priority of the traffic and type or identification of an application generating the traffic.

In Example 15, the subject matter of any one of Examples 1-14 may optionally include a memory storing, for each communication service class of a plurality of communication service classes, one or more congestion criteria predefined for the communication service class and the detector being configured to detect an upload data traffic congestion situation in the communication terminal detection based on the stored congestion criteria.

In Example 16, the subject matter of Example 15 may optionally include the detector being configured to detect an upload data traffic congestion situation for a communication service class based on the one or more congestion criteria predefined for the communication service class.

In Example 17, the subject matter of Example 16 may optionally include, when the detector has detected an upload data traffic congestion situation for a communication service class, the classifier being configured to assign this communication service class as the communication service class for which upload data traffic is to be reduced.

In Example 18, the subject matter of any one of Examples 1-17 may optionally include a reduction of the upload data traffic comprising blocking upload data packets containing upload data of a communication service of the assigned communication service class.

In Example 19, the subject matter of Example 18 may optionally include a communication processor, an application processor and an interface between the communication processor and the application processor, wherein the communication processor comprises the detector, the classifier and the controller and wherein blocking upload data packets comprises blocking the upload data packets from being transferred from the application processor to the communication processor via the interface.

In Example 20, the subject matter of any one of Examples 18-19 may optionally include the upload data packets being upload IP packets.

In Example 21, the subject matter of Example 20 may optionally include blocking upload IP packets comprising identifying IP packets containing upload data of a communication service of the assigned communication service class category based on at least one of the source IP address of the IP packet, the destination IP address of the IP packet, the port number contained in the IP packed and the radio bearer quality of service or logical channel priority of the IP packet.

In Example 22, the subject matter of Example 21 may optionally include the communication terminal being a mobile phone.

Example 23 is a method for handling upload traffic congestion as illustrated in FIG. 4.

In Example 24, the subject matter of Example 23 may optionally include the detecting, determining and controlling being performed by a communication processor of a communication terminal comprising an application processor and the communication processor.

In Example 25, the subject matter of Example 24 may optionally include initiating the reduction of upload data traffic by transmitting a congestion notification to the application processor.

In Example 26, the subject matter of any one of Examples 24-25 may optionally include the congestion notification specifying that the application processor is to reduce upload data traffic.

In Example 27, the subject matter of any one of Examples 24-26 may optionally include the application processor comprising a connection manager reducing upload data traffic belonging to a communication service of the assigned communication service class.

In Example 28, the subject matter of any one of Examples 24-27 may optionally include a reduction of the upload data traffic comprising identifying an application running on the application processor using a communication service of the assigned communication service class and requesting the application to reduce upload data traffic.

In Example 29, the subject matter of any one of Examples 23-28 may optionally include initiating a reduction of upload data traffic belonging to a communication service of the assigned communication service class and keeping the amount of traffic of communication services of other communication service classes than the assigned communication services unaffected.

In Example 30, the subject matter of any one of Examples 23-29 may optionally include detecting an upload data traffic congestion situation based on one or more predefined congestion criteria.

In Example 31, the subject matter of Example 30 may optionally include the one or more predefined congestion criteria being based on a buffer occupancy of a transmission buffer of a communication terminal for buffering upload data, a data residency time of a transmission buffer of the communication terminal for buffering upload data or a channel capacity of a communication channel for transmitting upload data.

In Example 32, the subject matter of any one of Examples 23-31 may optionally include detecting a level of an upload data traffic congestion situation in the communication terminal and initiating a reduction of upload data traffic belonging to a communication service of the assigned communication service class depending on the level of the upload data traffic congestion situation.

In Example 33, the subject matter of any one of Examples 23-32 may optionally include initiating, depending on the level of the upload data traffic congestion situation, a blocking of upload data traffic belonging to a communication service of the assigned communication service class or notifying a source of the upload data traffic belonging to a communication service of the assigned communication service class to reduce the upload data traffic.

In Example 34, the subject matter of any one of Examples 23-33 may optionally include detecting an end of the upload data traffic congestion situation and stopping the reduction of upload data traffic when having detected the end of the upload data traffic congestion situation.

In Example 35, the subject matter of any one of Examples 23-34 may optionally include storing, for each communication service class of a plurality of communication service classes, a definition of the communication service class in terms of characteristics of traffic belonging to the communication service class.

In Example 36, the subject matter of Example 35 may optionally include the characteristics of traffic including one or more of IP or TCP header information of data packets of the traffic, radio bearer quality of service of the traffic, logical channel priority of the traffic and type or identification of an application generating the traffic.

In Example 37, the subject matter of any one of Examples 23-36 may optionally include storing, for each communication service class of a plurality of communication service classes, one or more congestion criteria predefined for the communication service class and detecting an upload data traffic congestion situation in the communication terminal detection based on the stored congestion criteria.

In Example 38, the subject matter of Example 37 may optionally include detecting an upload data traffic congestion situation for a communication service class based on the one or more congestion criteria predefined for the communication service class.

In Example 39, the subject matter of Example 38 may optionally include, when having detected an upload data traffic congestion situation for a communication service class, determining this communication service class as the communication service class for which upload data traffic is to be reduced.

In Example 40, the subject matter of any one of Examples 23-39 may optionally include a reduction of the upload data traffic comprising blocking upload data packets containing upload data of a communication service of the assigned communication service class.

In Example 41, the subject matter of Example 40 may optionally include the detecting, determining and controlling being performed by a communication processor of a communication terminal comprising an application processor and the communication processor and blocking upload data packets comprising blocking the upload data packets from being transferred from the application processor to the communication processor via an interface between the communication processor and the application processor.

In Example 42, the subject matter of any one of Examples 40-41 may optionally include the upload data packets being upload IP packets.

In Example 43, the subject matter of Example 42 may optionally include blocking upload IP packets comprising identifying IP packets containing upload data of a communication service of the assigned communication service class category based on at least one of the source IP address of the IP packet, the destination IP address of the IP packet, the port number contained in the IP packed and the radio bearer quality of service or logical channel priority of the IP packet.

In Example 44, the subject matter of Example 43 may optionally include the communication terminal being a mobile phone.

Example 45 is a computer readable medium having recorded instructions thereon which, when executed by a processor, make the processor perform a method for handling upload traffic congestion according to any one of Examples 23-44.

Example 46 is a communication terminal comprising a detecting means for detecting an upload data traffic congestion situation in the communication terminal, a determining means for determining, in response to the detection of an upload data traffic congestion situation, a communication service class for which upload data traffic is to be reduced and a controlling means for initiating a reduction of upload data traffic belonging to a communication service of the assigned communication service class.

In Example 47, the subject matter of Example 46 may optionally include a communication processor and an application processor wherein the communication processor comprises the detecting means, the determining means and the controlling means.

In Example 48, the subject matter of Example 47 may optionally include the controlling means being for initiating the reduction of upload data traffic by transmitting a congestion notification to the application processor.

In Example 49, the subject matter of any one of Examples 47-48 may optionally include the congestion notification specifying that the application processor is to reduce upload data traffic.

In Example 50, the subject matter of any one of Examples 47-49 may optionally include the application processor comprising a connection manager for reducing upload data traffic belonging to a communication service of the assigned communication service class.

In Example 51, the subject matter of any one of Examples 47-50 may optionally include a reduction of the upload data traffic comprising identifying an application running on the application processor using a communication service of the assigned communication service class and requesting the application to reduce upload data traffic.

In Example 52, the subject matter of any one of Examples 46-51 may optionally include the controlling means being for initiating a reduction of upload data traffic belonging to a communication service of the assigned communication service class and for keeping the amount of traffic of communication services of other communication service classes than the assigned communication services unaffected.

In Example 53, the subject matter of any one of Examples 46-52 may optionally include the detecting means being for detecting an upload data traffic congestion situation in the communication terminal based on one or more predefined congestion criteria.

In Example 54, the subject matter of any one of Examples 53 may optionally include the one or more predefined congestion criteria being based on a buffer occupancy of a transmission buffer of the communication terminal for buffering upload data, a data residency time of a transmission buffer of the communication terminal for buffering upload data or a channel capacity of a communication channel for transmitting upload data.

In Example 55, the subject matter of any one of Examples 46-54 may optionally include the detecting means being for detecting a level of an upload data traffic congestion situation in the communication terminal and the controlling means being for initiating a reduction of upload data traffic belonging to a communication service of the assigned communication service class depending on the level of the upload data traffic congestion situation.

In Example 56, the subject matter of any one of Examples 46-55 may optionally include the controlling means being for initiating, depending on the level of the upload data traffic congestion situation, a blocking of upload data traffic belonging to a communication service of the assigned communication service class or notifying a source of the upload data traffic belonging to a communication service of the assigned communication service class to reduce the upload data traffic.

In Example 57, the subject matter of any one of Examples 46-56 may optionally include the detecting means being for detecting an end of the upload data traffic congestion situation and the controlling means being for stopping the reduction of upload data traffic when the detecting means has detected the end of the upload data traffic congestion situation.

In Example 58, the subject matter of any one of Examples 46-57 may optionally include a memory for storing, for each communication service class of a plurality of communication service classes, a definition of the communication service class in terms of characteristics of traffic belonging to the communication service class.

In Example 59, the subject matter of Example 58 may optionally include the characteristics of traffic including one or more of IP or TCP header information of data packets of the traffic, radio bearer quality of service of the traffic, logical channel priority of the traffic and type or identification of an application generating the traffic.

In Example 60, the subject matter of any one of Examples 46-59 may optionally include a memory for storing, for each communication service class of a plurality of communication service classes, one or more congestion criteria predefined for the communication service class and the detecting means being for detecting an upload data traffic congestion situation in the communication terminal detection based on the stored congestion criteria.

In Example 61, the subject matter of Example 60 may optionally include the detecting means being for detecting an upload data traffic congestion situation for a communication service class based on the one or more congestion criteria predefined for the communication service class.

In Example 62, the subject matter of Example 61 may optionally include, when the detecting means has detected an upload data traffic congestion situation for a communication service class, the determining means being for determining this communication service class as the communication service class for which upload data traffic is to be reduced.

In Example 63, the subject matter of any one of Examples 46-62 may optionally include a reduction of the upload data traffic comprises blocking upload data packets containing upload data of a communication service of the assigned communication service class.

In Example 64, the subject matter of Example 63 may optionally include a communication processor, an application processor and an interface between the communication processor and the application processor wherein the communication processor comprises the detecting means, the determining means and the controlling means and wherein blocking upload data packets comprises blocking the upload data packets from being transferred from the application processor to the communication processor via the interface.

In Example 65, the subject matter of any one of Examples 63-64 may optionally include the upload data packets are upload IP packets.

In Example 66, the subject matter of Example 65 may optionally include blocking upload IP packets comprising identifying IP packets containing upload data of a communication service of the assigned communication service class category based on at least one of the source IP address of the IP packet, the destination IP address of the IP packet, the port number contained in the IP packed and the radio bearer quality of service or logical channel priority of the IP packet.

In Example 67, the subject matter of any one of Examples 66 may optionally include the communication terminal being a mobile phone.

It should be noted that one or more of the features of any of the examples above may be combined with any one of the other examples.

In the following, examples are described in more detail.

In examples such as the ones described in the following, a smart flow control mechanism based on defined service categories is introduced. A service category (also referred to as communication service class or communication service type) represents one or a group of (communication) services provided to the user by applications running on the communication terminal, e.g. mobile terminal 200. A service category groups services that have similar characteristics like the same priority, quality of service, bandwidth, latency needs, etc. Instead of simply blocking the complete IPC interface and therefore affecting all services, the communication terminal triggers flow control only for one or more specific service categories. A flow control manager (e.g. implementing controller 303 and for example also detector 301 and classifier 302) may use different congestion criteria based on the service category. In other words, a congestion situation may occur for a certain service category (e.g. in this case referred to as "congested service category") while, for example, it does not occur for another service category for which another congestion criterion is defined.

Once a congestion is faced, i.e. the communication terminal (e.g. classifier 301) detects a congestion situation, the flow control manager may send for one or more service categories for which traffic is to be reduced, a notification to a connection manager hosted by the application processor or directly to the applications running on the application processor which use services of the one or more service categories. The applications or the connection manager can then reduce the traffic of the services or stop the services corresponding to the assigned service category.

A congestion situation may be seen to include a congestion between components of the communication terminal 300. For example, a modem of the communication terminal 300 is not able to handle the upload traffic generated by applications running on the communication terminal.

For example, the communication terminal provides mechanisms to

Identify a service category;

Detect a congestion situation (e.g. including configuration of congestion detection criteria, possibly depending on service class) and assign a service category for which traffic is to be reduced;

Initiate flow control for an assigned service category;

Block or reduce traffic of service of the assigned service category upon flow control initiation, for example including configuration of criteria for a flow control manager to detect the service category of a service.

FIG. 5 illustrates an example of an architecture of a communication terminal 500 for supporting the approach described above with reference to FIG. 3.

Similarly to the communication terminal 200, the communication terminal 500 includes an application processor 501 and a communication processor (modem) 502. Both the application processor 501 and the communication processor include an IPC block 503, 504 for implementing an IPC between them.

A plurality of applications 505 are running on the application processor 501. Further, the application processor 501 implements a protocol stack including a TCP/UDP protocol layer 306 and an IP stack 307 as well as a connection manager 508, e.g. by execution of corresponding program code.

The communication processor 502 includes a communication processor system (CPS) 509, a transmission buffer 510, a flow control manager 511 and a policy manager 512.

It should be noted that the communication processor 502 and the application processor 501 may be implemented by the same (e.g. multi-core) processor. For example, program code providing the modem functionality and applications can run on the same multi-core processor. Alternatively, the communication processor 502 and the application processor 501 may be separate hardware units, i.e. different processors.

The flow control manager 511 on the modem 502 is in charge of detecting the congestion situation based on one or more congestion criteria for example an IP flow queue length exceeding a certain threshold, a memory overflow, such as an overflow of the transmission buffer 510 or low bandwidth. The congestion criteria may depend on the service category and can for example be configured by the connection manager 508. For instance, a voice over IP service belongs to a different service category than a photo upload or application update. When congestion is faced (i.e. the flow control manager 511 has detected a congestion situation), the flow control manager 511 notifies the connection manager 508 which service category is to stop or reduce traffic.

The connection manager 508 is in charge of creating connections based on application requests and interacts with the modem 502 for connection creation and configuration of the IP stack 507. In case of congestion, it can block some traffic (of applications belonging to the assigned service class, e.g. block IP packets of such applications to be sent to the modem 502) or may notify the applications belonging to the assigned service class to reduce their traffic.

In another example, one or more additional applications and a connection manager may also be present on the modem 502 (in addition to the applications 505 and the connection manager 508 on the application processor 501). In such case the flow control manager 511 can also directly notify the connection manager on the modem and the one or more applications running on the modem without crossing the IPC 503.

FIG. 6 shows a message flow diagram 600 illustrating an example for a procedure for handling a congestion.

The message flow takes place between a first application 601, a second application 602, which for example correspond to two of the applications 505, a connection manager 603 corresponding to connection manager 508, an IP stack 604 corresponding to IP stack 507, a flow control manager 605 corresponding to flow control manager 511 and a communication processor system (CPS) 606 corresponding to communication processor system 509.

In 607, the connection manager 603 configures the description of the service categories (cat1 and cat2 in this example) and in 608 the criteria to detect the congestion for the service categories by transmitting corresponding configuration messages 609, 610 to the flow control manager 605.

In 611, the first application 601 requests an Internet connection. In 612, the connection manager 603 establishes a corresponding connection by corresponding communication with the communication processor system 606 which establishes a PDN connection in 613 and reports success of the connection establishment to the first application 601 in 614.

In 615, the second application 602 requests a VoIP connection. In 616, the connection manager 603 establishes a corresponding connection by corresponding communication with the CPS 606 which establishes a PDN connection in 617 and reports success of the connection establishment to the second application 602 in 618.

As a result, there is a first data flow 619 between the first application 601 and the IP stack 604, a second data flow 620 between the second application 602 and the IP stack 604, and a data flow 621 corresponding to a combination of the first data flow 619 and the second data flow 620 between the IP stack 604 and the CPS 606.

It is assumed that in 622, the flow control manager 605 detects a congestion situation, e.g. an occupancy of the transmission buffer 510 which lies above a predefined threshold.

In 623, the flow control manager 605 notifies the connection manager 603 about the congestion situation along with the service category impacted by the congestion (with a congestion notification also referred to as flow control notification), i.e. the service category for which traffic is to be reduced, category 2 (cat2) in this example.

In 624, the connection manager takes necessary action to reduce or stop the traffic corresponding to service category 2. In this example, the connection manager 603 blocks the traffic of the first application such that only the data flow of the second application 602 remains.

A service category may for example be defined based on one or more of the following characteristics:
IP traffic flow identification using source/destination IP address, source/destination port number, DSCP (differentiated service code point) bits in IP header, . . . (e.g. similar to the criteria of the Traffic Flow Template (TFT) filter defined by 3GPP): all IP traffic matching predefined values of one or more of these parameters belongs to an associated service category.
EPS (Evolved Packet System) bearer quality of service: all IP traffic flowing over the EPS bearer with a predefined quality belongs to an associated service category.
MAC Logical channel priority: all IP traffic flowing over the logical channel with a predefined priority belongs to an associated service category. It should be noted that in LTE there is a one to one mapping between an EPS bearer and a MAC logical channel, so the EPS bearer associated to the same MAC logical priority can be identified. Further, it should be noted that with the uplink TFT filter it is possible to identify on which EPS bearer IP data is sent.
Application type or application ID. These are for example be converted characteristics usable by the flow control manager 511 (that potentially only see IP traffic and has no visibility of the applications that generate the traffic). The connection manager 508 can for instance based on the application type classify an application type to one service category. As the application type can for example not be used by the modem 502, the connection manager 508 may convert the application type to some other detection rules. For instance, when an application has an open socket for data transmission, the connection manager 508 may identify that the application is part of a certain service category and map the corresponding port/IP address to this service category.

The respective predefined values of these characteristics are for example part of the definition of the service categories and are for example stored in the communication terminal. The service categories may be freely configurable, e.g. in terms of the above characteristics.

The flow manager 511 may use these characteristics to identify the traffic that leads to a congestion situation and may thus identify a service category leading to a congestion and then notify this service category to the connection manager 508. The connection manager 508 may configure the policy for the flow control manager 511 for the detection of a congestion and, after receiving a notification of a congestion situation from the flow control manager 511, handles the congestion notification to take corrective action (such as stopping some traffic).

The detection of a congestion situation for a service category, e.g. by the flow control manager 511 in the above example, may be based on one or more of the following:

average transmission rate: IP traffic from a certain service category is for example only allowed if the actual transmission rate over the air is above a certain threshold. For example, if the average upload transmission rate of the communication terminal is below a predefined threshold (e.g. x Mbps), then only the IP traffic for the service categories allowed at this data rate are transmitted.

transmission buffer occupancy: IP traffic from a certain service category is only allowed if the occupancy of the transmission buffer 510 is below a certain threshold. The threshold level may depend on the service category.

age of IP data residing in the transmission buffer 510: if the IP data for one service category is residing in the transmission buffer 510 for longer than a predefined threshold (e.g. x ms), then the flow control manager 511 may send a flow control notification for this service category.

Multiple thresholds may be defined for a specific congestion criterion and a specific service category in order to deliver different levels of urgency in a flow control notification. For example, depending on whether the transmission buffer occupancy exceeds a first threshold, a second threshold or a third threshold, the flow control notification may specify that a traffic reduction is desired, a traffic reduction is required, or traffic is blocked. Several congestion criteria may also be configured for the same service category wherein each criterion corresponds to a level of congestion, i.e. a congestion of a certain level is detected for that service category when a congestion criterion associated with that level is fulfilled.

Further, the threshold for enabling flow control (i.e. enabling traffic reduction by means of a congestion notification) may be different from the threshold disabling the flow control (i.e. disabling the traffic reduction), such that there is a hysteresis in the flow control activation/deactivation.

As explained above, once it detects a congestion situation, the flow control manager 511 sends a notification to the connection manager 508 to indicate the one or more service categories which are congested, i.e. for which traffic is to be reduced. Along with the congestion notification, it may also provide information about the service description associated with this category (e.g. an IP traffic flow identifier, an EPS bearer QoS, an MAC logical channel priority) which the connection manager 508 may use to identify IP packets belonging to services or the service category.

The flow control manager 511 may use several levels of flow control notifications, such as:

a "pre-warning" notification to allow the connection manager 508 or the applications using a service of an indicated service category to reduce or stop traffic.

a congestion notification informing the connection manager 508 that the flow control manager 511 has initiated that the IPC is blocked for the one or more indicated service categories or that the flow control manager 511 has initiated deletion of data belonging to the one or more indicated service categories from the transmission buffer 510.

Upon reception of a flow control notification for one or more service categories, the connection manager 508 may for example identify the corresponding application or applications i.e. one or more applications using a service of one of the one or more service categories, and and may take one of the following actions for an identified application:

Notify the application to reduce traffic;

Notify the application to close traffic or notify the application that the connection is lost;

Block the application TCP/UDP socket.

If the congestion situation remains, the flow control manager 511 can then take further actions such as blocking an IPC connection for traffic of services of the one or more service categories or delete data pending in the transmission buffer for the one or more service categories.

It should be noted that an existing mechanism may also benefit from this flow based congestion notification, for instance to free memory associated only with a congested service category instead of freeing memory independently of the service category a flow.

The configuration (i.e. definition) of the service categories may for example be provided in a data base accessible by the flow control manager 511. It may also be provided by the applications 505 or the connection manager 508 to the flow control manager 511.

Similarly, the configuration of the criteria for the congestion detection (i.e. the congestion criteria) can be provided in a data base accessible by the flow control manager 508. It can also be provided by the applications 505 or the connection manager 508 to the flow control manager 511.

Table 1 below provides one example on how a congestion detection for different service classes and detection levels (and corresponding notification levels) may be configured. For example, for the service category 3, the flow control manager 511 sends a notification of congestion for service category 3 to the connection manager 508 if the transmission buffer 510 occupancy is above 80% or if the actual transmission rate is below 1 Mbps. The flow control manager 511 sends a notification of the end of the congestion for service category 3 if the transmission buffer occupancy is less than 70% and if the transmission data rate is above 1.2 Mbps.

TABLE 1

| Category | Data rate congestion threshold | End of congestion related to transmission data rate | Congestion notification threshold (memory pool occupancy) | End of congestion notification threshold (memory pool occupancy) | Delay congestion notification |
|---|---|---|---|---|---|
| 1 | None | None | None | None | None |
| 2 | None | None | 90% | 80% | None |
| 3 | Transmission data rate <1 Mbps | Transmission data rate >1.2 Mbps | 80% | 70% | None |
| 4 | Transmission data rate <10 Mbps | Transmission data rate >12 Mbps | 60% | 50% | 1000 ms |

The signaling of the various flow control and congestion information is for example physical interface dependent.

Examples such as the ones described above can be used to target the linkage between 3GPP defined quality of service (QoS) and the IP protocol defined QoS in a communication terminal such as a smartphone, tablet, etc. type of user equipment (UE).

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication terminal comprising:
a detector configured to monitor a transmission buffer of the communication terminal and to detect, based on an occupancy of the transmission buffer, an upload data traffic congestion level in the communication terminal;
a classifier configured to assign, in response to the detection of an upload data traffic congestion situation, one or more communication service classes for which upload data traffic is to be reduced; and
a controller configured to initiate a reduction of upload data traffic for a first communication service class if the upload data traffic congestion level is greater than a first threshold, and to initiate a reduction of upload data traffic for the first communication service class and for a second communication service class if the upload data traffic congestion level is greater than a second threshold.

2. The communication terminal of claim 1, comprising a communication processor and an application processor, wherein the communication processor comprises the detector, the classifier, the controller, and the transmission buffer.

3. The communication terminal of claim 2, wherein the controller is configured to initiate the reduction of upload data traffic by transmitting a congestion notification to the application processor.

4. The communication terminal of claim 2, wherein the congestion notification specifies that the application processor is to reduce upload data traffic.

5. The communication terminal of claim 2, wherein the application processor comprises a connection manager configured to reduce upload data traffic belonging to a communication service of the first communication service class and to reduce upload data traffic belonging to a communication service of the second communication service class.

6. The communication terminal of claim 2, wherein a reduction of the upload data traffic for the first communication service class comprises identifying an application running on the application processor using a communication service of the first communication service class and requesting the application to reduce upload data traffic.

7. The communication terminal of claim 1, wherein the controller is configured to initiate a reduction of upload data traffic belonging to a communication service of the one or more communication service classes and to keep the amount of traffic of communication services of other communication service classes unaffected.

8. The communication terminal of claim 1, wherein the detector is configured to detect an upload data traffic congestion situation in the communication terminal based on the occupancy of the transmission buffer by: detecting the upload traffic congestion situation based on one or more predefined congestion criteria related to the occupancy of the transmission buffer.

9. The communication terminal of claim 8, wherein the one or more predefined congestion criteria are based on the occupancy of the transmission buffer of the communication terminal, a data residency time of the transmission buffer of the communication terminal configured to buffer upload data or a channel capacity of a communication channel for transmitting upload data.

10. The communication terminal of claim 1, wherein the controller is configured to initiate a reduction of upload data traffic belonging to a communication service of the first communication service class depending on the upload data traffic congestion level.

11. The communication terminal of claim 1, wherein the controller is configured to initiate, depending on the upload data traffic congestion level, a blocking of upload data traffic belonging to a communication service of the first communication service class or notify a source of the upload data traffic belonging to a communication service of the first communication service class to reduce the upload data traffic.

12. The communication terminal of claim 1, wherein the detector is configured to detect an end of the upload data traffic congestion situation and the controller is configured to stop the reduction of upload data traffic when the detector has detected the end of the upload data traffic congestion situation.

13. The communication terminal of claim 1, comprising a memory storing, for each communication service class of a plurality of communication service classes, a definition of the communication service class in terms of characteristics of traffic belonging to the communication service class.

14. The communication terminal of claim 13, wherein the characteristics of traffic includes one or more of IP or TCP header information of data packets of the traffic, radio bearer quality of service of the traffic, logical channel priority of the traffic and type or identification of an application generating the traffic.

15. The communication terminal of claim 1, comprising a memory storing, for each communication service class of a plurality of communication service classes, one or more congestion criteria predefined for the communication service class and wherein the detector is configured to detect an upload data traffic congestion situation in the communication terminal detection based on the stored congestion criteria.

16. The communication terminal of claim 15, wherein the detector is configured to detect an upload data traffic congestion situation for the first communication service class based on the one or more congestion criteria predefined for the first communication service class.

17. The communication terminal of claim 16, wherein, when the detector has detected an upload data traffic congestion situation for the first communication service class, the classifier is configured to assign the first communication service class as one of the one or more communication service classes for which upload data traffic is to be reduced.

18. The communication terminal of claim 1, wherein a reduction of the upload data traffic for the first communication service class comprises blocking upload data packets containing upload data of a communication service of the first communication service class.

19. A method for handling upload traffic congestion comprising monitoring a transmission buffer of the communication terminal;
detecting, based on an occupancy of the transmission buffer, an upload data traffic congestion level;
determining, in response to the detection of an upload data traffic congestion situation, one or more communication service classes for which upload data traffic is to be reduced;
initiating a reduction of upload data traffic for a first communication service class if the upload data traffic congestion level is greater than a first threshold; and
initiating a reduction of upload data traffic for the first communication service class and for a second communication service class if the upload data traffic congestion level is greater than a second threshold.

20. A non-transitory computer readable medium having recorded instructions thereon which, when executed by a processor, make the processor perform a method for handling upload traffic congestion, the method comprising:
monitoring a transmission buffer of the communication terminal;
detecting, based on an occupancy of the transmission buffer, an upload data traffic congestion level;
determining, in response to the detection of an upload data traffic congestion situation, one or more communication service classes for which upload data traffic is to be reduced;
initiating a reduction of upload data traffic for a first communication service class if the upload data traffic congestion level is greater than a first threshold; and
initiating a reduction of upload data traffic for the first communication service class and for a second communication service class if the upload data traffic congestion level is greater than a second threshold.

* * * * *